INVENTOR.
HERBERT H. NAIDICH
BY
ATTORNEY

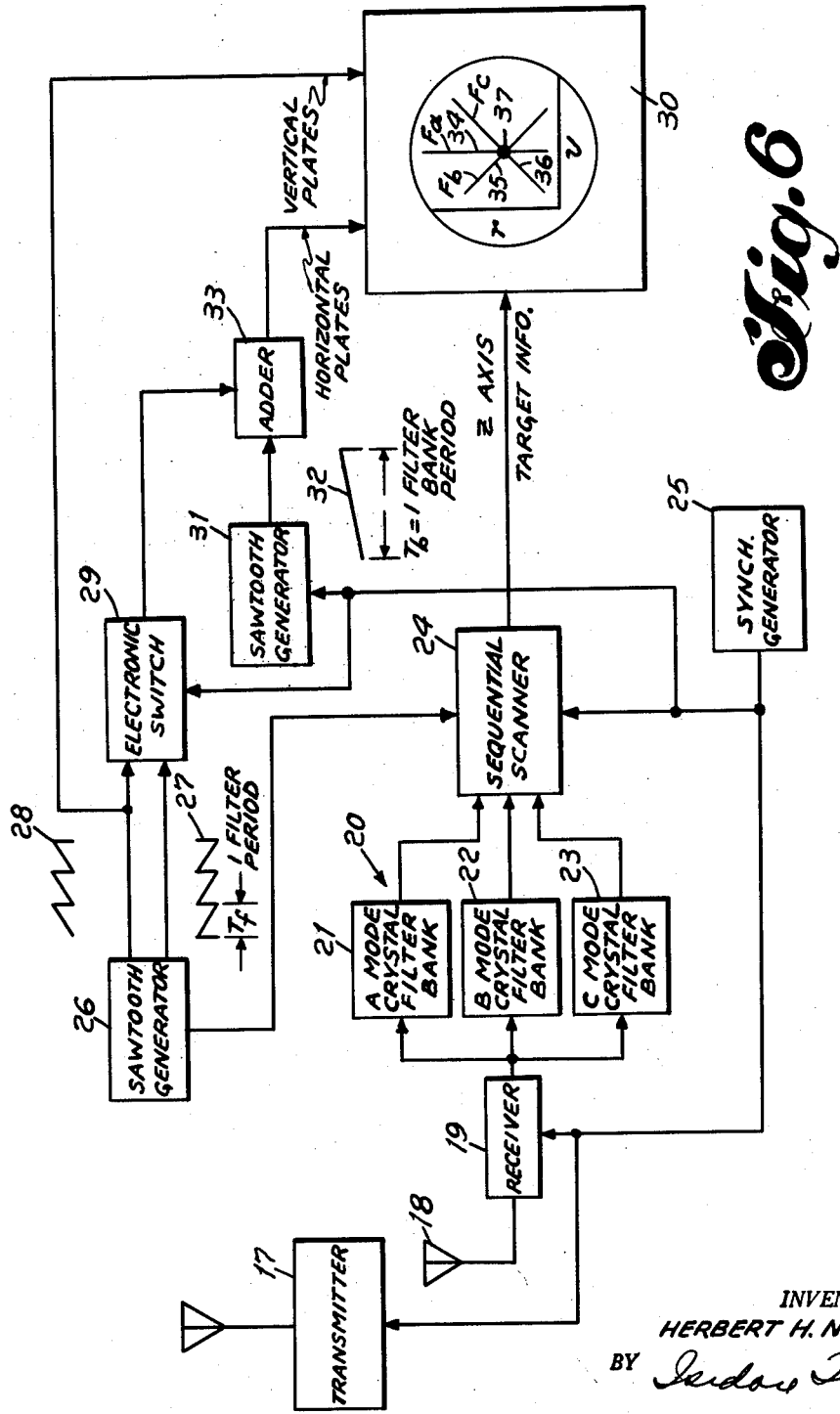

United States Patent Office 3,149,326
Patented Sept. 15, 1964

3,149,326
F.M. RADAR DISPLAY DEPICTING VELOCITY
AND RANGE
Herbert H. Naidich, Passaic, N.J., assignor to International Telephone and Telegraph Corporation, Nutley, N.J., a corporation of Maryland
Filed Sept. 3, 1959, Ser. No. 837,989
7 Claims. (Cl. 343—9)

This invention relates to a distance and velocity determining system and more particularly to a frequency modulated continuous wave radar system.

Continuous wave radar transmitters are known for determining the velocity of an object relative a radar transmitter and receiver by means of the Doppler effect. Frequency modulated continuous wave radars have been in use for determining also the range of a target relative a transmitter by means of linearly varying the frequency of a continuous wave between selected upper and lower frequency range limits. As is already well known a portion of this radiated wave will be reflected from one or more targets at different ranges in its path of propagation, and returned to the transmitter receiver. At the transmitter receiver station means are then provided for receiving the one or more reflected waves and also for receiving a wave directly from the wave transmitting or radiating means. At any instant each of the radiated waves will differ in frequency from the radiated wave frequency due to the difference in length of path over which the wave travels. This difference in frequency corresponds to the change in frequency of the radiated wave which takes place during the time interval required for the radiated wave to reach the target and return. It is thus evident that the instantaneous difference in frequency between the radiated wave and any reflected wave will be an index of the range between the target and the station since the transmission velocity of the wave is considered to be a constant. Thus, if at any instant there are a plurality of targets at different ranges in the path of a radiated wave there will be a corresponding number of reflected waves returning to the station simultaneously, and each of which is different in frequency from the frequency of the transmitted wave. When these are combined with the radiated wave there will be produced a corresponding number of beat frequency waves. If the target is moving relative the station or vice versa then the velocity information, the Doppler effect, is included in the reflected waves. In the prior art it has been possible to scan the entire spectrum of beat frequencies which may possibly be present for a certain range limits depending upon the capability of the system to determine the presence of any echo wave returning to the station. The echo waves are then portrayed simultaneously on an oscilloscope screen so that the operator can determine the bearing and range of the one or more targets relative to the sending and receiving station. However, while cathode ray tube displays for pulse radars are well known, in which an intensified pulse appears on the display with distance proportional to echo time there is no such simple and natural method of range scanning and indication in the case of FM radar since all of the methods previously used for FM radar display have been complex and costly.

It is therefore an object of this invention to provide a range and rate indication for a frequency modulated continuous wave radar system which is relatively simple and inexpensive.

Another object is to provide an indication system for a frequency modulated continuous wave radar which will continuously display both the velocity and range of a target relative the transmitting receiving station.

Still another object of this invention is to provide an economical velocity and range indication system for FM radar which will simultaneously display both the velocity and ranges of a multiplicity of targets relative the transmitting receiving station.

A feature of this invention is that in an FM radar system for transmitting continuous wave signals consisting of a plurality of modes of signals sequentially transmitted, each mode being a specific type of modulation and containing a band of frequencies, the received signals after reflection from the target contain the range and velocity information of the target relative to the transmitter and receiver. The receiver includes Crystal filter banks for separating the detected signals into the corresponding modes. These modes are then separately scanned in the same sequence as when transmitted and are coupled to display means to indicate on the display means the range and velocity of the target. The modes comprise a first mode of unmodulated continuous waves, a second mode of frequency-modulated continuous waves of a descending frequency and a third mode of frequency modulated continuous waves of an ascending frequency.

The above-mentioned and other features and objects of this invention will become more apparent by reference to the following description taken in conjunction with the accompanying drawings, in which:

FIG. 6 is a block diagram of the embodiment of this invention.

The basic equations for an FM continuous wave radar system are:

(1) $F_a = f_d$
(2) $F_b = f_d + f_r$
(3) $F_c = f_d - f_r$ where $F_a$ is equal to the frequency deviation of the received carrier due to the Doppler effect when the radar carrier is not frequency modulated. $F_b$ is the frequency deviation of the received carrier when the carrier is linearly decreased in frequency. This frequency deviation is proportional to the sum of the Doppler frequency $f_d$ and the frequency shift proportional to the echo time $f_r$. Similarly, when the carrier is linearly increased in frequency the deviation of the received carrier $F_c$ is equal to the difference between $f_d$ and $f_r$.

Figure 1:
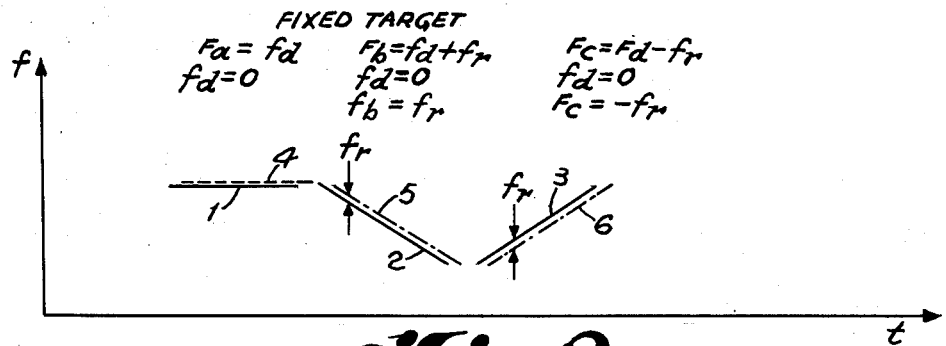
FIG. 1 is a graph of frequency versus time showing the transmitted waves of a continuous wave radar system which are both unmodulated and frequency modulated and the received waves from a fixed target which has no relative movement.
Figure 2:
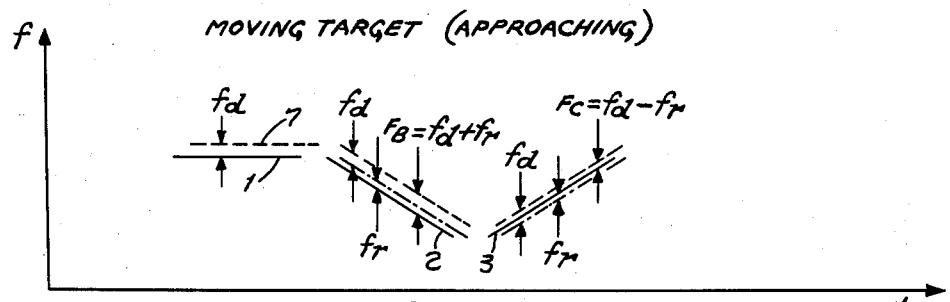
FIG. 2 is a graph showing the same waves with reflected waves from a moving target approaching the transmitter receiver station.
Figure 3:
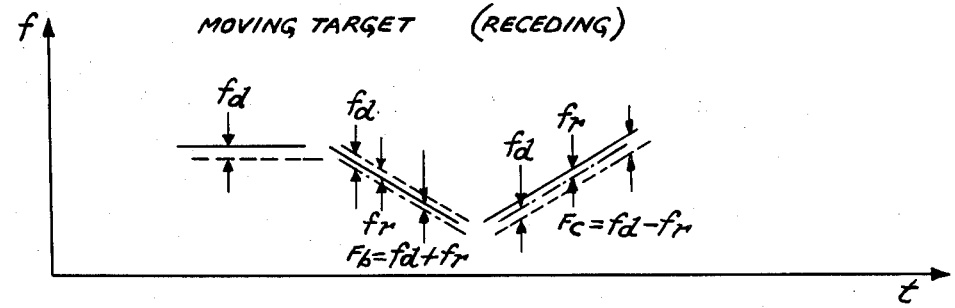
FIG. 3 is a graph showing the same transmitted waves with the reflected waves from a moving target receding from the transmitter receiver station.

Turning now to FIGS. 1, 2 and 3 the various modes of transmission of a frequency modulated continuous wave radar are shown together with the reflected waves and the frequency deviation resulting therefrom in the cases of a target which is fixed relative to the transmitter receiver, a target which is approaching the transmitter receiver station and a target which is receding from the transmitter receiver station. The horizontal line 1 represents a continuous wave transmission at a fixed frequency. The descending ramp 2 represents the frequency modulation with decreasing frequency of a continuous wave and the ramp 3 represents the frequency modulation in ascending frequency of the continuous wave. In the case of the fixed target and where there is no frequency modulation of the transmitted continuous wave signal, the received wave 4 is shown slightly displaced for illustration from the wave 1 and represents no frequency shift but a delay in time due to the echo time. The returned wave 5 is an indication solely of the range of the target from the transmitter receiver represented by the frequency deviation (or beat frequency) $f_r$ which is related to the echo time. It can be shown that $f_r = (2/C)F'R$ where C is the speed of light, R is the range of the reflecting target and F' is the rate of change of frequency (c.p.s. per second). In the case of the ascending ramp 3 the reflected wave is of the character 6 and illustrates the frequency deviation which is indicative of the range of target from the transmitter receiver.

Where the target is approaching the transmitter receiver then the Doppler frequency $f_d$ as shown by the returned echo wave 7 represents the frequency deviation due to the Doppler effects and hence the velocity of the target relative the station. In the case of the descending ramp signal 2 the frequency deviation (or beat frequency) of the reflected wave $F_b$ now comprises both the Doppler frequency shift ($f_d$) and the shift proportional to the echo time, $f_r$, both of which, of course, are delayed in time. In the case of the ascending ramp frequency 3 the frequency deviation $F_c$ is equal to the difference between the Doppler frequency $f_d$ minus the frequency shift due to range $f_r$. The same relationships hold true for the case of the target receding from the transmitter station except that in this case the Doppler frequency is less than transmitter frequency. Equations 1, 2 and 3 above can be rewritten as:

(4) $\quad f_d = F_a$
(5) $\quad f_r = -f_d + F_b$
(6) $\quad f_r = f_d - F_c$

These three linear equations when plotted on a graph will all intersect at a point whose coordinates are proportional to $f_r$ and to $f_d$, that is the range and the range rate, and if presented on a CRT indicator will give an indication of the target range and velocity. Two linear equations are sufficient to obtain an intersection but three are necessary when multiple targets are acquired. This can be shown more clearly with reference to FIG. 5 which is a graph of $f_r$ (range) versus $f_d$ (velocity). The linear equations $F_a$, $F_b$ and $F_c$ are shown for three targets 8, 9 and 10. It can be seen that if there were only two equations there could be intersections at points 11, 12, 13, 14, 15 and 16 which would provide false indications of targets but the addition of the third equations pinpoints the particular target and removes any ambiguity that may occur with only the use of two equations in the display. FIGURE 6 shows the means by which the graph of FIGURE 5 can be presented on a cathode ray tube.

Figure 4:
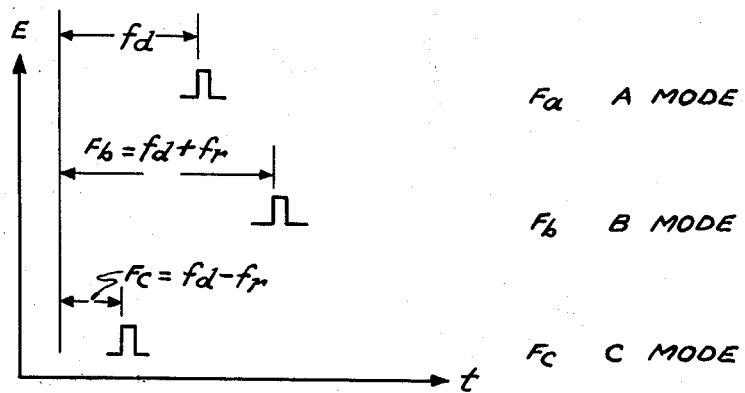
FIG. 4 is a graph showing the received waves from a target in each of three modes of transmission of the signals in this invention, as would be displayed on a spectrum analyzer where "f" is proportional to frequency.

Referring now to FIG. 6 there is shown a transmitter 17 which is an FM-C.W. transmitter capable of transmitting continuous waves, frequency modulated continuous waves along a descending frequency and frequency modulated continuous waves along an ascending frequency in a sequential manner as shown more particularly in FIGS. 1, 2 and 3. The received wave reflected from a target (not shown) is received by the antenna 18 and detected in the receiver 19. The detected output of the receiver 19 is fed into a group 20 of crystal filters. The group 20 is composed of three crystal filter banks 21, 22 and 23. In the receiver, the received signal is beat against the transmitted signal to produce the beat frequencies. During the A mode or unmodulated continuous wave transmission, the beat frequencies produced by the receiver are fed to the filter bank 21. These beat frequencies can be labeled $F_{a1}$, $F_{a2}$, $F_{a3}$ . . . $F_{an}$ and correspond to Equation 1. There is a beat frequency for each target that is detected. Similarly, the beat frequencies during mode B can be referred to as $F_{b1}$, $F_{b2}$, $F_{b3}$ . . . $F_{bn}$, where again there is a total of $n$ beat frequencies, one for each detected target, and each beat frequency is proportional to the radial velocity plus a quantity determined by its range as indicated in Equation 2. Again in mode C the beat frequencies, $F_{c1}$, $F_{c2}$, $F_{c3}$ . . . $F_{cn}$, are determined by the velocities and ranges of the individual targets as indicated in Equation 3. One well known means for examining a spectrum of frequencies is by means of a spectrum analyzer. The theory and operation of the frequency spectrum analyzers are described in Chapter 7, volume 11 of the Massachusetts Institute of Technology Radiation Laboratory Series entitled "Technique of Microwave Measurements," published by McGraw-Hill Book Company, Inc., 1947. The output of a spectrum analyzer is generally a cathode ray tube where an electron beam is deflected from left to right as simultaneously a single narrow filter is searched through the frequency band of interest in a super-heterodyne receiver. If a signal exists at a particular frequency, a vertical "blip" or deflection is caused on the cathode ray tube. As the speed of deflection of the electron beam is a function of time, and as this is in synchronism with the searching of the single filter through the frequency band of interest, the resultant display indicates the distribution of signals as a function of frequency with the magnitude of the signal proportional to the vertical deflection. This type of display is illustrated in FIGURE 4, for a single target with a particular range and frequencies, when the relationship of these frequencies for the three modes of operation is as indicated in Equations 1, 2, and 3. An alternate form of spectrum analyzer consists of a bank of filters, where each filter is assigned a portion of the spectrum to be analyzed. If each filter has the frequency bandwidth of the single filter described in the previous type of spectrum analyzer and if a filter is assigned for each portion of the spectrum to be examined, this second type of spectrum analyzer will have similar characteristics to the first type. If the filter bank is energized by a receiver which examines a spectrum of frequencies, only those filters will be energized which are tuned to the frequencies which are present in the spectrum. If the outputs of each filter is sampled in a sequential manner, in synchronism with the deflected electron beam, and the energy in each filter causes a vertical deflection to be induced to the deflected beam on a cathode ray tube, an identical picture is produced as by the first type of spectrum analyzer and illustrated in FIGURE 4.

A discussion of frequency measuring techniques for FM radars is contained in volume 1 of the Massachusetts Institute of Technology Radiation Laboratory Series, "Radar Systems Engineering," Ridenour, McGraw-Hill Book Company, Inc., 1947, pages 147–149 entitled "Multiple-Target F-M Range Measurements." The use of a single filter which scans the frequency spectrum or a bank of filters is described. The general class of parallel filters is illustrated by reference to the Frahm vibrating-reed frequency meter. An example of a spectrum analyzer using parallel filters is shown in U.S. Patent 2,705,742.

Either type of spectrum analyzer can be used. In FIGURE 6, the second type of spectrum analyzer is described where filter bank 21 is assigned to the A mode, filter bank 22 is assigned to the B mode and filter bank 23 is assigned to the C mode. The sync generator 25 synchronizes the various parts of the system to operate in the proper mode A, B, or C. The sync generator 25 in one form can have three outputs, i.e., a first pulse for A mode operation, a second pulse starting on termination of the first pulse for B mode operation and a third pulse commencing on terminaton of the second pulse for C mode operation. It causes the output of the receiver to be routed to the A mode filter bank 20 during the A mode and similarly to the B and C mode filter banks 22 and 23 when the system is to operate in the B or C modes.

The sequential scanner 24 is either an electronic or mechanical switch which examines the energy in the filters of the respective filter banks. For example, it may comprise three continuously operating rotating switches, one for each mode A, B, or C and each containing a number of contacts equivalent to the number of filters in each bank. The output line of each switch can have a relay which is closed by a pulse from the sync generator 25 when an output from that switch is fed to the display tube 30 during the duration time of that mode. The sync generator 25 causes the sequential scanner to start the scan of the A, B, or C filter bank as required, and the signal from the sawtooth generator 26 determines the duration time ($T_f$) the sequential scanner spends at each filter of each mode switch section. This time ($T_f$) is identical to the period of each sawtooth 27, generated in sawtooth generator 26.

Figure 5:
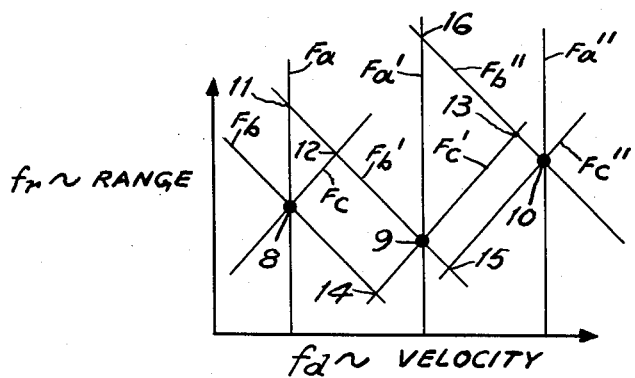
FIG. 5 is a simplified graph which is to be utilized for cathode ray tube display.

The video output of the sequential scanner is similar to that illustrated in FIGURE 4 but in this case is used to intensify the trace on the cathode ray tube and is called z axis target info. in FIG. 6. The sawtooth generator 26 generates two sawtooths shown by the waveforms 27 and 28 which are 180° out of phase. The sawtooth 28 is fed to an electronic switch 29 and to the vertical plates of a cathode ray display tube 30. The sawtooth 27 as well as the sawtooth 28 are fed to an electronic switch 29 to which is also fed the synchronizing wave of sync generator 25. Electronic switch 29, for example, may consist of two relays, each one connected to a separate output of sawtooth generator 26 and actuated by a mode signal in either the B or C mode from sync generator 25. A sawtooth generator 31 generates a sawtooth 32 which has a duration time $T_b$ equal to the time that it takes to scan one crystal filter bank of either the A, B or C mode. The output of the electronic switch 29 and the sawtooth generator 31 are fed into an adder circuit 33 and the output of the adder circuit 33 is coupled to the horizontal plates of the cathode ray tube 30. The output of the sequential scanner 24 which is the signal information is coupled to the Z axis input of the cathode ray tube 30. During the A mode scanning there is no output from the electronic switch of the sawtooth 27 and therefore only the sawtooth generated by the sawtooth generator 31 is produced from the adder 33 that is fed to the horizontal plates of the cathode ray tube 30. The only input to the vertical deflection plates of the cathode ray tube 30 is the sawtooth 28 which is fed to the vertical plates thereof. A series of vertical lines will be generated, one line for each filter in bank A. The only lines that will be intensified are the ones which receive an intensification signal on the z axis target information line. This signal will then intensify the sweep line 34 which is equivalent to the signal frequency shift $F_a$, that is, only the Doppler frequency. During the B mode scanning operation, the electronic switch 29 will select the sawtooth 27 which will be passed to adder 33 and combined with the output of the sawtooth generator 31 to provide an output of adder 33 which is fed to the horizontal plates and will therefore generate a series of lines that are at a 45° angle, one for each filter in bank B, on the cathode ray tube 30 when combined with the sawtooth fed to the vertical plates. An intensification or z axis signal will cause one or more lines to be intensified during this B mode raster, as indicated by 35 on the cathode ray tube which indicates only one target is present. During the C mode scanning period, the electronic switch will select the sawtooth 28 which will be fed to the adder and the output of the adder, together with the sawtooth 28 on the vertical plate, will generate a series of scanning lines which are perpendicular to those generated during the B mode scan. Only those lines which correspond to a filter which contains a target will be intensified. Dot 37 indicates a single intensified target. The display presentation will then be similar to the graph indicated in FIGURE 5. The graph is a solution to the simultaneous Equations 4, 5, and 6. The coordinates of the points of triple intersection are proportional to the range and velocity of the respective targets as indicated in FIGURE 5. By the use of suitable phosphors or storage tubes the only point visible will be the point of triple intersection.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a radar system for transmitting continuous wave signals consisting of a plurality of types of modulation of signals sequentially transmitted and having means for receiving and detecting said signals after reradiation from a target, said received signals containing range and velocity information of said target; means for separating said detected signals into the corresponding types of modulation, display means, and means for applying the detected signals of said types of modulation in the same sequence as when transmitted to said display means to indicate on said display means the range and velocity of said target.

2. In a radar system for transmitting continuous wave signals consisting of a plurality of types of modulation of signals sequentially transmitted comprising a first type of unmodulated continuous waves, a second type of frequency-modulated continuous waves of a descending frequency, and a third type of frequency-modulated continuous waves of an ascending frequency and having means for receiving and detecting said signals after reflection from a target, said received signals containing range and velocity information of said target; means for separating said detected signals into the corresponding types of modulation, display means, and means for applying the detected signals of said types of modulation to said display means in the same sequence as when transmitted to indicate on said display means the range and velocity of said target.

3. In a radar system for transmitting continuous wave signals consisting of a plurality of types of modulation of signals sequentially transmitted comprising a first type of unmodulated continuous waves, a second mode of frequency-modulated continuous waves of a descending frequency and a third type of frequency-modulated continuous waves of an ascending frequency and having means for receiving and detecting said signals after reflection from a target, said received signals containing range and velocity information of said target, said received signals of said first type containing Doppler signals having the velocity information of said target, said received signals of said second and third types containing both the Doppler signals and the range signals of said target, means for separating said detected signals into the corresponding types of modulation display means and means for applying the detected signals of said types of modulation to said display means in the same sense as when transmitted to indicate on said display means the range and velocity of said target.

4. In a radar system according to claim 3 wherein said means for separating said detected signals comprise a plurality of groups of filters, each said group being adapted to pass detected signals of a corresponding type of transmission.

5. In a radar system according to claim 4 wherein said means for applying the detected signals of each said filter group to said display means comprises means to synchronize the sequence of application of the outputs of said filter groups with the sequence of transmission and reception of said signals of said types.

6. In a radar system according to claim 5 wherein said means for applying the detected signals of each said filter groups further include means for controlling the time during which each filter of each said filter group is coupled to said display means.

7. In a radar system according to claim 3 wherein said display means comprises a cathode ray display tube and means coupled to the deflection plates of said cathode ray tube for generating sequentially in accordance with said sequential transmission of said types of said signals, a first horizontal scanning line on the screen of said cathode ray tube during the time of transmission and reception of said first signal type, a second scanning line inclined at an angle of 45 degrees during the time of transmission of said second signal type and a third scanning line inclined at an angle of 45 degrees and at right angles to the scanning line of said second type during the time of transmission of the signals of said third type, and the position of each received signal on said screen is determined by the intersection of said three scanning lines.

References Cited in the file of this patent
UNITED STATES PATENTS

| | | |
|---|---|---|
| 2,612,636 | Rust | Sept. 30, 1952 |
| 2,860,331 | Pridmore | Nov. 11, 1958 |
| 2,896,203 | Wright | July 21, 1959 |